Patented Sept. 24, 1929

1,729,255

UNITED STATES PATENT OFFICE

ALFRED HOFFMAN, OF KEW GARDENS, NEW YORK

MANUFACTURE OF DIACETONE ETHERS

No Drawing.   Application filed December 31, 1926.   Serial No. 158,416.

The usual methods of preparing ethers cannot be commercially used for making ethers of diacetone alcohol because this alcohol is so sensitive to the acids and alkalies as ordinarily employed.

I have found it possible to prepare various ethers from mesityl oxide by the addition of some primary alcohol in the presence of a small quantity of an acid.

In practice a mixture of mesityl oxide and an alcohol with a small amount of a strong mineral acid such as hydrochloric or sulphuric is allowed to stand a few days at ordinary room temperature.

The reaction comes to an equilibrium when about twenty to twenty-five per cent of ether is formed—the lower the temperature the more ether. In fact in some cases refrigeration materially aids the process and increases the yield. The action is apparently catalytic.

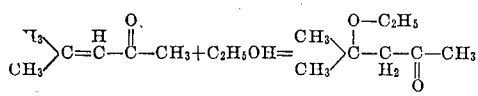

Various neutral or mildly alkaline substances such as calcium hydroxide or sodium carbonate may be used for neutralization. Other obvious methods of separation of the products of the process will occur to those skilled in the art.

Two examples will be sufficient to understand the principles of the invention.

*Example I.*—A mixture of 60 lbs. mesityl oxide, 56 lbs. absolute ethyl alcohol, 3 lbs. concentrated sulphuric acid are allowed to stand at room temperature until the specific gravity of the mixture ceases to rise. It is then placed in a copper still equipped with a stirrer, 4 lbs. of calcium hydroxide are added and the unchanged alcohol distilled off while stirring the mixture and applying external heat. Finally, the ether and any excess mesityl oxide are distilled with steam, dried with calcium chloride and fractioned. This should produce approximately 19 lbs. of ether with a boiling point of about 160° to 170° C. This method is advantageous for low boiling alcohols easily soluble in water as the unchanged materials are recovered, substantially dry and ready to use for the next batch.

*Example II.*—100 lbs. butyl alcohol, 132 lbs. mesityl oxide, 7 lbs. concentrated sulphuric acid. This mixture is allowed to stand until the reaction is complete. A concentrated solution of 25 lbs. crystalline sodium carbonate is then added, the mixture well stirred and then steam distilled. The ether is isolated from the distillate by fractionation. This should yield about 59 lbs. of ether with a boiling point about 198° to 199° C. This process is suitable for high boiling alcohols slightly soluble in water.

The general method is applicable to aliphatic primary alcohols such as methyl, ethyl, propyl, etc. alchols and also to aromatic primary alcohols such as benzyl alcohol.

In general the mesityl oxide may vary from say 50 to 60 parts of the mixture, the alcohol about 50 to 40 parts, and the acid about 2 to 3 parts. The proportions will vary with the quality and character of ingredients used.

These diacetone ethers are colorless, stable liquids boiling unchanged at about 90° C. higher than the boiling point of the alcohol used. They are good solvents for nitrocellulose and for many gums and resinous substances.

They offer interesting chemical possibilities; for instance, the keto group can be reduced to an alcohol group. When the reduced products are distilled with a few drops of sulphuric acid an unsaturated hydrocarbon is formed, a hexadiene, which may be easily polymerized to a rubber.

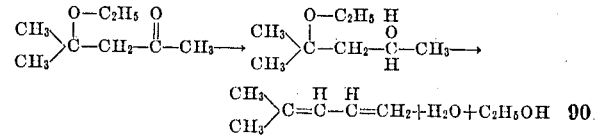

Such ethers may be used in various lacquer formulæ in place of other media and high boiling solvents.

I claim:

1. The method of making a diacetone ether which consists in mixing a primary alcohol with mesityl oxide in the presence of a strong acid, allowing it to stand and separating out the ether.

2. The method of forming a diacetone ether which comprises mixing a primary alcohol with mesityl oxide in the presence of a strong mineral acid, allowing the reaction to take place, neutralizing the acid and separating the products.

3. The method of making a diacetone ether which comprises mixing about fifty-two percent of a primary alcohol with about forty-five percent of mesityl oxide and about three percent of a mineral acid, allowing the reaction to take place and then separating out the ether.

4. The method of forming a diacetone ether which comprises mixing a primary alcohol with mesityl oxide in the presence of a strong mineral acid, allowing the reaction to proceed, neutralizing the acid by a mildly alkaline substance, distilling off the alcohol and isolating the ether by fractionation.

5. The method of forming a diacetone ether which comprises mixing a primary alcohol with mesityl oxide in the presence of a strong mineral acid allowing the mixture to stand at a temperature not greater than normal room temperature and separating out the ether.

6. The method of forming a diacetone ether which comprises mixing approximately equal parts of a primary alcohol, mesityl oxide and a lesser quantity of sulphuric acid, allowing the reaction to take place until the specific gravity becomes substantially constant, adding an alkaline substance to neutralize the acid, removing any unchanged alcohol, then separating out the ether.

7. The method of forming a diacetone ether which comprises mixing about fifty to forty parts of a primary alcohol with about fifty to sixty parts of mesityl oxide and about two to three parts of a strong mineral acid, allowing it to stand and then separating out the ether.

8. The method of forming diacetone ether comprising mixing a primary alcohol with mesityl oxide in the presence of a strong acid in the proportions of from about 50 to 60 parts of mesityl oxide, from about 50 to 40 parts of alcohol and about 2 to 3 parts acid, allowing the mixture to stand while the reaction takes place and then separating out the ether.

ALFRED HOFFMAN.